United States Patent [19]
Jones

[11] Patent Number: 5,170,668
[45] Date of Patent: Dec. 15, 1992

[54] UNIT FOR MEASURING OR OTHER DEVICE

[76] Inventor: Barbara L. Jones, 80 Chisbury Close, Forest Park Bracknell, RG12 3TX, England

[21] Appl. No.: 747,265

[22] Filed: Aug. 19, 1991

[30] Foreign Application Priority Data

Aug. 17, 1990 [GB] United Kingdom ................. 9018148

[51] Int. Cl.⁵ ............................................. G01L 11/00
[52] U.S. Cl. .................................. 73/704; 73/861.18; 73/862.41; 73/862.59; 73/DIG. 1
[58] Field of Search ...................... 73/702, 704, 861.18, 73/861.21, DIG. 1, 862.59, 862.41, 580, 581; 310/338, 324, 368, 369

[56] References Cited

U.S. PATENT DOCUMENTS

| 4,813,271 | 3/1989 | Greenwood | 73/702 |
| 4,841,775 | 6/1989 | Ikeda et al. | 73/704 |
| 5,009,108 | 4/1991 | Harada et al. | 73/704 |

*Primary Examiner*—Donald O. Woodiel
*Attorney, Agent, or Firm*—Scully, Scott, Murphy & Presser

[57] ABSTRACT

A unit which is useful in a measuring device such as a vibration rod transducer. The unit comprises supported diamond layers having an unsupported bridging diamond strip which is integrally formed with the supported diamond layers. The supported diamond layers may form part of a closed configuration such as a circle, square, rectangle or triangle. The diamond is preferably CVD diamond.

6 Claims, 1 Drawing Sheet

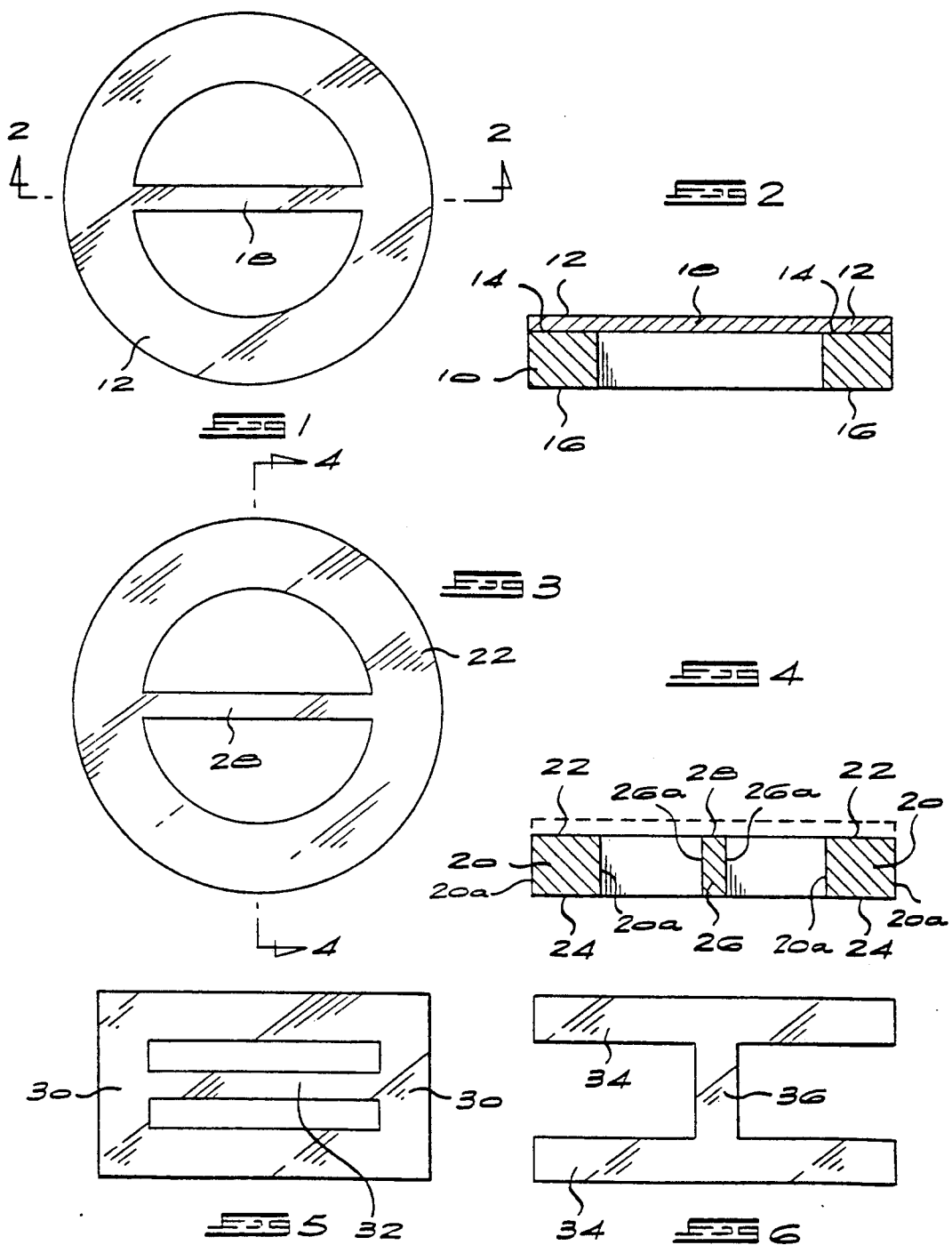

UNIT FOR MEASURING OR OTHER DEVICE

BACKGROUND OF THE INVENTION

This invention relates to a unit for use in a measuring device such as a vibration rod transducer or other device.

A vibration rod transducer is a device which is used for measuring pressure, flow rate and other like parameters. The apparatus includes an elastic support, typically in the form of a ring, which is subjected to a load under measurement, a bridging strip across the support, an electromagnetic unit on one side of the strip and an electromagnetic generator on the other side of the strip. When the strip is made of a metal and starts to vibrate, an EMF is generated in the electromagnetic unit, the frequency of which is equal to the frequency of oscillation of the strip. The signal from the electromagnetic unit is transmitted to an amplifier, the output of which is coupled to the generator. The frequency of oscillation is dependent on the pressure, flow, or other like parameter in which the transducer is placed.

One known method of producing diamond layers on a substrate is chemical vapour deposition (CVD). CVD involves the synthesis of diamonds from the gas phase. The process generally involves providing a mixture of hydrogen or oxygen gas and a suitable gaseous carbon compound such as a hydrocarbon, applying sufficient energy to that gas to dissociate the hydrogen or oxygen into atomic hydrogen or oxygen and a gas into active carbon ions, atoms or CH radicals and allowing such active species to deposit on a substrate to form diamond. Dissociation of the gases can take place by a variety of methods.

One such method is the use of a hot filament. In this method, the gas temperature at the filament is about 2000° C. and the temperature of the substrate on which diamond growth occurs is about 800° to 1100° C.

A second commonly used method of dissociation is a plasma assisted method. The hydrogen or oxygen and gaseous carbon compound are excited into a reactive state in a plasma region. The energy of excitation may be microwave, RF or DC plasma, UV light or heat. The substrate is heated by the plasma.

SUMMARY OF THE INVENTION

The invention provides a unit which is useful in a measuring device such as a vibration rod transducer or other device. The unit comprises spaced diamond layers each presenting major surfaces on opposite sides thereof, a support bonded to one of the major surfaces of each diamond layer, and at least one unsupported diamond bridging strip joining the supported diamond layers and being integrally formed therewith. The diamond bridging strip is unsupported, i.e. has no support bonded to it.

DESCRIPTION OF THE DRAWINGS

FIG. 1 is a plan view of a unit of the invention for use in a vibration rod transducer of the invention, FIG. 2 is a sectional side view along the line 2—2 of FIG. 1, FIG. 3 is a plan view of a support for use in producing the unit of FIGS. 1 and 2, FIG. 4 is a section along the line 4—4 of FIG. 3, FIG. 5 is a plan view of another embodiment of a unit of the invention, and FIG. 6 is a plan view of yet another embodiment of a unit of the invention.

DESCRIPTION OF EMBODIMENTS

Both the diamond bridging strip or strips and the supported diamond layers are preferably thin, e.g. less than 100 microns in thickness. Typically, the thickness will lie in the range 5 to 100 microns.

The support must be capable of adhering to diamond and may be selected from silicon, silicon nitride, silicon carbide, and other metal carbides.

The diamond bridging strip or strips will be integrally formed with the supported diamond layers. This is preferably achieved by producing the strip or strips and supported diamond layers simultaneously using a method such as chemical vapour deposition. Depending on the use to which the unit is to be put, there may be provided more than one diamond bridging strip.

The supported diamond layers may be separate and distinct from each other or form part of a closed configuration such as a circle, square, rectangle or triangle.

The unit of the invention has particular application in measuring devices such as a vibration rod transducer or as a vibrating support for an accelerometer or deformable steering device. The unit also has application in integral lens/waveguide structures.

An embodiment of the invention will now be described with reference to FIGS. 1 and 2 of the accompanying drawings. Referring to these figures, a unit for a vibration rod transducer comprises a support ring 10 having a thin continuous layer of diamond 12 bonded to its top surface 14. The support ring has a lower surface 16. A diamond bridging strip 18 is integrally formed with the diamond layer 12. Thus, possibility of mechanical breakage at the intersection between the layer 12 and the bridging strip 18, as can occur in bridging strips in known vibration rod transducers, is significantly reduced.

The unit illustrated by FIGS. 1 and 2 may be made using a pre-formed support body as illustrated by FIGS. 3 and 4. Referring to these figures the body has an outer ring 20 having major surfaces 22 and 24 on opposite sides thereof. Extending diametrically across the ring 20 is a bridge 26 which is integrally formed with the outer ring 20. A layer of diamond will be deposited on the major surface 22 of the ring 20 and the top surface 28 of the bridge 26 by chemical vapour deposition. This diamond layer is illustrated by dotted lines in FIG. 4. To minimise diamond deposition on the side surfaces 20a and 26a of the ring and bridge, respectively, a suitable masking material may be provided on these surfaces.

Thereafter, the bridge 26 is removed by etching or other similar method. The side surfaces 20a and lower surface 24 of the ring are coated with a material such as a wax. The body is placed in an etching or like solution. This has the effect of dissolving the bridge 26. The outer ring is protected by the wax and remains intact, as does the diamond layer. The wax-protective layer may then be removed to produce a unit as illustrated by FIGS. 1 and 2.

In an example of the invention, the support ring was a silicon support ring; the diamond was deposited on the silicon support ring using a microwave plasma CVD method producing a diamond layer of about 30 microns in thickness; and the etching solution was a hydrofluoric/nitric acid mixture.

FIG. 5 illustrates a plan view of a second embodiment of the unit. In this unit, the ceramic supported diamond layers 30 form part of a rectangle. The bridging diamond strip is indicated by the numeral 32.

In the embodiment of FIG. 6, the supported diamond layers 34 and the bridging diamond strip 36 take the form of an "H". In this embodiment, the strip 36 bridges supported diamond layers 34 which are separate and distinct from each other in contrast to the embodiment of FIGS. 1 and 5 wherein the supported diamond layers form part of a closed configuration.

I claim:

1. A unit for use in a measuring or other device comprises spaced diamond layers each presenting major surfaces on opposite sides thereof, a support bonded to one of the major surfaces of each diamond layer, and at least one unsupported diamond bridging strip joining the supported diamond layers and being integrally formed therewith.

2. A unit according to claim 1 wherein the supported diamond layers and the bridging diamond strip or strips have a thickness of no more than 100 microns.

3. A unit according to claim 1 or claim 2 wherein the support is a material selected from silicon, silicon nitride, silicon carbide and other metal carbides.

4. A unit according to claim 1 wherein the supported diamond layers form part of a closed configuration.

5. A unit according to claim 4 wherein the closed configuration is selected from a circle, square, rectangle and triangle.

6. A unit according to claim 1 wherein the diamond is CVD diamond.

* * * * *